Sept. 2, 1958  M. HANSBURG ET AL  2,850,689
APPARATUS FOR PRODUCING A SERVO SYSTEM TEST SIGNAL
Filed May 31, 1956
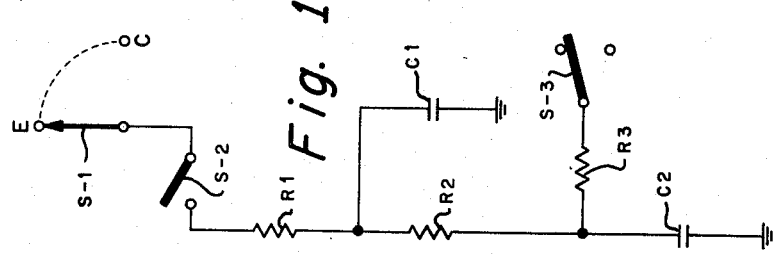
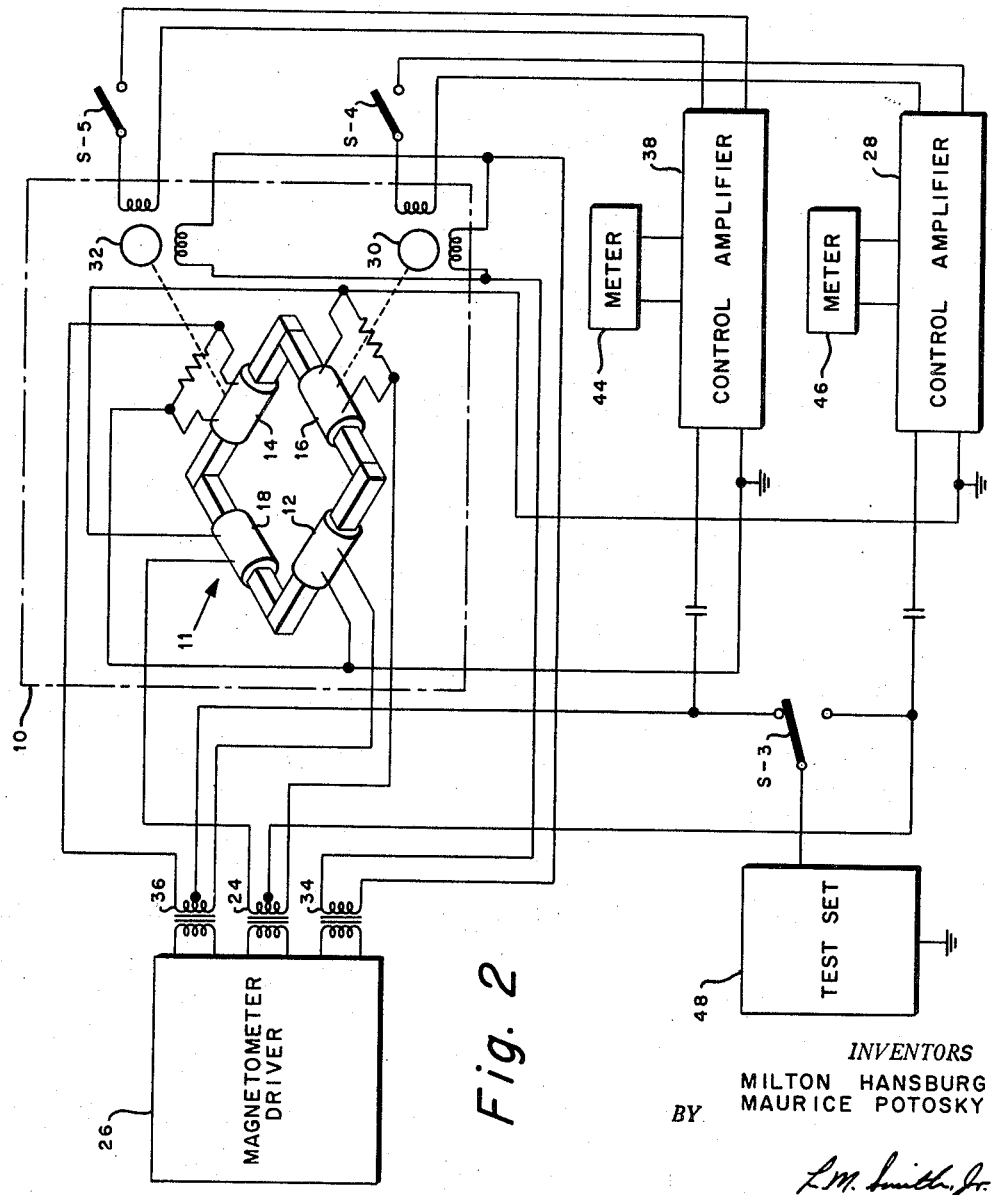
INVENTORS
MILTON HANSBURG
MAURICE POTOSKY
BY
ATTORNEYS United States Patent Office 2,850,689
Patented Sept. 2, 1958

2,850,689

APPARATUS FOR PRODUCING A SERVO SYSTEM TEST SIGNAL

Milton Hansburg, Weisel, and Maurice Potosky, Levittown, Pa., assignors to the United States of America as represented by the Secretary of the Navy Application May 31, 1956, Serial No. 588,591

6 Claims. (Cl. 318—28)

(Granted under Title 35, U. S. Code (1952), sec. 266)

The invention herein disclosed may be used by and for the Government of the United States of America for governmental purposes without the payment of any royalties thereon or therefor.

The present invention relates to electrical apparatus for producing servo test signals and more particularly to apparatus for producing test signals suitable for checking the proper response of a servo channel.

In magnetic field detection systems, servo loops are utilized to maintain the detecting magnetometers in proper alignment with the earth's magnetic field. In order to insure proper operation of the servo loops, test equipment is utilized to deliver predetermined test signals into the error end of each servo loop and the latter is observed for proper response. Existing test equipment rely on involved circuitry and a multiplicity of tubes delivering a sine wave output for this purpose.

The present invention develops suitable transient test signals representing maximum unbalance conditions for feeding into the error end of servo loops in order to check the follow-up response of the servos. Specifically, these test signals, which are produced by a simple R–C circuit not involving the use of tubes and complex associated circuitry, have rate of change characteristics reflecting maximum conditions to be met in service, such as those imposed by maneuvering of the aircraft. By such application of error signals, the servos may be observed for proper response and follow-up.

An object of the present invention is the provision of apparatus consisting of a relatively simple R–C circuit for testing the follow-up in a servo system by supplying to the servo system a predetermined signal representing a peak angular velocity and acceleration response required in the servo axis.

A further object of the invention is the provision of a simplified circuit devoid of tubes and complex circuitry for producing a predetermined test signal for use in testing the follow-up operation of a servo used in the orientation arrangement of magnetic field detection equipment.

Another object of the invention is the provision of an R–C network having a predetermined transient response to an applied step function type of signal for use in testing the proper response of a servo system.

Other objects and advantages of the invention will hereinafter become more fully apparent from the following description of the annexed drawing, which illustrates a preferred embodiment, and wherein:

Fig. 1 shows the inventive test circuit.

Fig. 2 illustrates a typical application of the inventive test circuit of Fig. 1.

Referring to Fig. 1, the inventive circuit consists of a two-position switch S–1 having its "C" and "E" positions connected to a D. C. power supply, not shown. The stops C and E represent "calibration" and "error," respectively, each of which represents a different, predetermined voltage for the purpose to be described below. In series with switch S–1 is a simple "on-off" switch S–2 connected at its opposite end to resistors, $R_1$, $R_2$, and $R_3$ in series. Resistor $R_3$ is connected to the center tap of a two-position selector switch S–3, also illustrated in Fig. 2. A pair of condensers $C_1$ and $C_2$ are connected between ground and the points between $R_1$ and $R_2$, and $R_2$ and $R_3$, respectively.

The values of $R_1$, $R_2$, $R_3$, $C_1$, and $C_2$ in the circuit of Fig. 1 must be selected to deliver a predetermined current build up to each servo channel representing a predetermined angular velocity and acceleration response in the detector head of the servo channel. Selection of these values is described further below.

Fig. 2 shows a magnetometer orientation arrangement like the one appearing in the application "Orientation System for Magnetometers," Serial No. 461,696, filed October 11, 1954, in the names of M. Potosky, M. Hansburg, and J. H. Davis, herein shown utilizing the instant test circuit. Detecting head unit 10 of the magnetic field detection equipment includes the orientor magnetometers 12, 14, 16, and 18 arranged as a square in a common plane (platform) for the purpose of maintaining the detector magnetometers (not illustrated) in alignment with the earth's magnetic field, as described and shown in the aforementioned application. In order to accomplish this continuous orientation purpose, the coils in magnetometers 16 and 18 are arranged in the form of a bridge receiving their 400 cycle per second driving voltage from output transformer 24 of magnetometer driver 26. The center tap of transformer 24 will produce no error signal output when magnetometers 16 and 18 are exactly at right angles to the earth's magnetic field. As explained in the application referred to above, the driving voltage consists of pulses with approximately equal positive and negative amplitudes. The difference in amplitudes of the + and − pulses is the error voltage. When these magnetometer coils are not exactly at right angles to the earth's field, an error voltage is produced at the center tap of transformer 24 and is supplied to servo amplifier 28 amplifying and delivering this "error" to servo motor 30 in order to rotate magnetometer head 11 in one plane and in such a direction as to cancel the error. The fixed phase of servo motor 30, as well as the fixed phase of servo motor 32, is supplied by output transformer 34 of magnetometer driver 26. In a similar manner, orientor magnetometers 12 and 14 are energized by transformer 36 of driver 26 and the error signal taken from the center tap of transformer 36 is used in the servo amplifier 38 to reposition magnetometers 12 and 14 by motor 32. Hence, the plane or platform formed by magnetometers 12, 14, 16 and 18 will be continuously maintained perpendicular to the earth's magnetic field in spite of changes in position of the apparatus or aircraft supporting the magnetic field detecting instrument.

Test set 48 embodies the novel circuit illustrated in Fig. 1 and delivers its test signal through switch S–3 to either magnetometer bridge. The error signal produced by each orientor magnetometer is passed to the respective amplifiers 28 or 38 through ground. Switches S–4 and S–5 are used to open and close the servo loops for the reasons to be described hereinbelow.

The present invention is designed to check the accuracy of servo loop follow-up in both servo channels. In order to carry out this function, the circuit of Fig. 1 must have a transient response to the application of a D. C. voltage input $E_i$ through switch S–1 such as to represent a maximum predetermined angular velocity and acceleration in the servos necessary to permit proper follow-up by the loop and maintenance of the platform in its proper relationship to the earth's magnetic field. This would be maximum follow-up conditions imposed, for example, by aircraft maneuvering. The angular position, velocity and acceleration of the platform resulting when switch S–2 is closed feeding in the test signal may be evaluated from a mathematical analysis of the transient current flowing through $R_3$ as a function of time.

The transfer function of the network shown in Fig. 1 at some frequency $f$ is:

$$(1) \quad \frac{e_o}{e_i} = \frac{G_1 G_2 / C_1 C_2}{P^2 + P\left(\frac{G_1 + G_2}{C_1} + \frac{G_2 + G_3}{C_2}\right) + \frac{G_1 G_2 + G_2 G_3 + G_3 G_1}{C_1 C_2}}$$

where $G_1$, $G_2$ and $G_3$ are the conductances of $R_1$, $R_2$ and $R_3$, respectively; $P = j\omega$ and $e_o$ and $e_i$ are the instantaneous voltage output and input, respectively.

Noting that in the instant case the input signal is a step function having an amplitude voltage of $E_i$, the instantaneous output voltage $e_o$ of the circuit as a function of time $(t)$ becomes:

$$(2) \quad E_o(t) = \frac{\frac{G_1 G_2}{C_1 C_2} E_i}{\alpha\beta(\beta - \alpha)} [\beta - \alpha - \beta e^{-\alpha t} + \alpha e^{-\beta t}]$$

where $\alpha$ and $\beta$ appear in the roots $(P+\alpha)(P+\beta)$ of the bi-nomial denominator of Equation 1.

The angular position "$\theta_o$" of the servo axis or platform may be related to the output voltage "$e_o$" as follows:

$$(3) \quad \theta_o = \frac{K E_o(t)}{R_3}$$

The conversion constant "K," in radians of axis motion (of the platform) per ampere of magnetometer current in each magnetometer, may be determined experimentally for each magnetometer. This constant converts, for a given earth's magnetic field, a unit amount of magnetometer current in each orientor bridge coil to an equivalent amount of platform motion. Although there is a separate value of K for each bridge, the two are usually in close agreement. The constant is measured by an operating servo system and is a product of a steady state condition. In Formula 3, $$\frac{E_o}{R_3}$$

represents magnetometer current approximately, since the resistances of the coils are small compared to $R_3$.

Substituting (3) into (2) we obtain the following expression for the axis position as a function of time:

$$(4) \quad \theta_o = \frac{\frac{K E_i}{C_1 C_2 R_1 R_2 R_3}}{\alpha\beta(\beta - \alpha)} [\beta - \alpha - \beta e^{-\alpha t} + \alpha e^{-\beta t}]$$

The first derivative of Equation 4 will yield the angular velocity of the axis as a function of time:

$$(5) \quad \frac{d\theta_o}{dt} = \frac{\frac{K E_i}{C_1 C_2 R_1 R_2 R_3}}{\beta - \alpha} [e^{-\alpha t} - e^{-\beta t}]$$

Acceleration of the axis obtained from the second derivative of Equation 4, will be:

$$(6) \quad \frac{d^2\theta_o}{dt^2} = \frac{\frac{K E_i}{C_1 C_2 R_1 R_2 R_3}}{\beta - \alpha} [-\alpha e^{-\alpha t} + \beta e^{-\beta t}]$$

Examination of Equations 4, 5, and 6 shows that, at the time $t=0$, the position and velocity of the axis are both zero, satisfying requirement $(c)$, while the acceleration is maximum. The time at which the velocity is maximum may be determined by equating the acceleration in Equation 6 to zero. Performing the above operations, we obtain the following equations:

$$(7) \quad \text{Maximum acceleration } Am = \frac{K E_i}{C_1 C_2 R_1 R_2 R_3}$$

$$(8) \quad t, \text{ at maximum velocity} = \frac{\log_e \beta/\alpha}{\alpha(\beta/\alpha - 1)}$$

Substituting above for $t$ in Equation 5:

$$(9) \quad \text{Maximum velocity } V_m = \frac{Am}{\alpha(\beta/\alpha - 1)} \left[ e^{\frac{-\log_e \beta/\alpha}{\beta/\alpha - 1}} - e^{-\frac{\beta \log_e \beta/\alpha}{\alpha \beta/\alpha - 1}} \right]$$

The roots $P+\alpha$ and $P+\beta$ of the binomial occurring in Equation 1, may be evaluated from the binomial formula or from the two following linear equations:

$$(10) \quad \beta + \alpha = \frac{G_1 + G_2}{C_1} + \frac{G_2 + G_3}{C_2}$$

$$(11) \quad \alpha\beta = \frac{G_1 G_2 + G_2 G_3 + G_3 G_1}{C_1 C_2}$$

With Equations 7 through 11, there is sufficient information to calculate the values for $R_1$, $R_2$, $R_3$, $C_1$ and $C_2$ provided the requirements for the test circuit are known, that is, the limiting values of acceleration and velocity to be produced in the servos. The technique of successively selecting convenient values for the components and then calculating the response in the servo loop has proved to be successful, although any other method to establish the values of the components may be resorted to.

The test circuit of Fig. 1 may be utilized in the magnetometer arrangement of Fig. 2 to check the follow-up of the servo loops, as follows:

It is first necessary to calibrate amplifiers 28 and 38 by opening switches S-4 and S-5 to shut down the servo loops. Switch S-1 is rotated to the "calibration" position to provide for the delivery of a predetermined voltage $E_i$ to the test circuit representing the test signal for a 3-minute deviation of the platform from null. This voltage may be calculated from formula $$E_i = \frac{\theta_o}{K}(R_1 + R_2 + R_3)$$

Switch S-2 is then closed causing a surge of current through the test circuit of Fig. 1 to the input of amplifier 28. The needle in current meter 46 will settle at some value after the transients disappear. The needle position hence represents the output of amplifier 28 representing an error of 3 minutes in the platform. Similar calibration is made of amplifier 38.

In order to check the follow-up of the servo loops, switches S-4 and S-5 are closed to permit loop operation. Switch S-1 is moved to the "error" position to provide an input voltage to the test circuit, the output of which will cause the platform to move in such a manner that maximum conditions of acceleration and velocity of motion will occur. Switch S-3 is moved to select the servo channel to be checked. With the platform in a stable position, switch S-2 may be either closed or opened to permit a surge of current to be introduced into the servo amplifier from the selected magnetometer bridge. As seen from the mathematical analysis, maximum acceleration current will be at $t=0$. However, if the servo channel follow-up is operating correctly, the system will operate so quickly that during the period it takes for the current to build up through the test circuit the platform will be rotating in the direction to cancel the "error" signal and will follow the signal within 3 minutes of arc at all times. Hence, the meter needle should not exceed the previously calibrated reading for 3 minutes of arc. Since maximum acceleration or rate of current build-up is at $t=0$, the amplifier meter needle will swing to its maximum value at this time, and should not in its swing exceed its previously calibrated position.

It is thus seen that there has been provided a relatively simple arrangement for testing the follow-up in a servo loop. While the test circuit has been described in connection with servo loops used in magnetometer orientor circuits, the circuit should find application as a simple testing device in other servo systems. By the technique described, the test circuit may be designed or custom fitted specially for a specific use.

An additional requirement which may be satisfied in calculating the values of the components in the circuit of Fig. 1 would be the physical limits of angular deviation permissible in the platform. For example, in the particular magnetometer of Fig. 2, a typical installation of the device limited the platform to a 40° rotation from null in either direction of rotation. Therefore, the test circuit should be designed to prevent the current $$\frac{E_o}{R_1+R_2+R_3}$$

from exceeding a value which may be determined from Formula 3, wherein $\theta_c = \theta_m$ is equal to the maximum angular displacement noted above.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A servo network having a predetermined transient response to an applied voltage being a time step function comprising, in combination, first, second and third resistance means in series between a source of said voltage and the point of use, first capacitance means between ground and the point joining said first and second resistance means, and second capacitance means between ground and the point joining said second and third resistance means, said applied voltage ($E_i$) and said resistance and capacitance means being related in accordance with the relation:

(1) $$\frac{d^2\theta_o}{dt^2} = \frac{\frac{KE_i}{R_1R_2R_3C_1C_2}}{\beta-\alpha}[\alpha e^{-\alpha t}+\beta e^{-\beta t}]$$

where $\theta_o$ represents an instantaneous angular servo response to the instantaneous output voltage of said network; $R_1$, $R_2$, $R_3$, $C_1$, $C_2$ represent the values of said resistance and capacitive means, respectively; K represents an experimentally determined conversion constant relating said angular response to said instantaneous output voltage of said network; and (2) $$\beta+\alpha = \frac{G_1+G_2}{C_1} + \frac{G_2+G_3}{C_2}$$

(3) $$\alpha\beta = \frac{G_1G_2 + G_2G_3 + G_3G_1}{C_1C_2}$$

where $G_1$, $G_2$, and $G_3$ are the conductances of $R_1$, $R_2$, and $R_3$, respectively.

2. A servo test network having a predetermined transient response to an applied D. C. voltage comprising, in combination, first, second and third resistance means in series between a source of said D. C. voltage and the point of use, first capacitance means between ground and the point joining said first and second resistance means, and second capacitance means between ground and the point joining said second and third resistance means, said applied D. C. voltage ($E_i$) and said resistance and capacitance means being related in accordance with the relation:

(1) $$\frac{d\theta_o}{dt} = \frac{\frac{KE_i}{C_1C_2R_1R_2R_3}}{\beta-\alpha}[e^{-\alpha t} - e^{-\beta t}]$$

wherein $\theta_o$ represents an instantaneous angular servo response to the instantaneous output voltage of said network; $R_1$, $R_2$, $R_3$, $C_1$, $C_2$ represent the values of said resistance and capacitance means, respectively; K represents an experimentally determined conversion constant relating said angular response to the said instantaneous output voltage of said network; and (2) $$\beta+\alpha = \frac{G_1+G_2}{C_1} + \frac{G_2+G_3}{C_2}$$

(3) $$\alpha\beta = \frac{G_1G_2 + G_2G_3 + G_3G_1}{C_1C_2}$$

where $G_1$, $G_2$, and $G_3$ are the conductances of $R_1$, $R_2$ and $R_3$, respectively.

3. An error signal producing network for testing the follow-up of a servo system consisting of amplifier and motor means, comprising, in combination, first, second and third resistance means in series, the latter resistance means connected to said amplifier input, means for selectively applying a D. C. voltage ($E_i$) to said first resistance means, first capacitance means between ground and the point joining said first and second resistance means, and second capacitance means between ground and the point joining said second and third resistance means, said voltage $E_i$, the instantaneous voltage $e_o$ delivered to said amplifier means, and said resistance and capacitance means all being related in accordance with the relation:

(1) $$Am = \frac{KE_i}{R_1R_2R_3C_1C_2}$$

wherein $Am$ is the maximum acceleration of the servo required in service; $R_1$, $R_2$, $R_3$, $C_1$, and $C_2$ represent the values of said resistance and capacitive means, respectively; and K is a constant.

4. An error signal producing network for testing the follow-up of a servo system consisting of amplifier and motor means, comprising, in combination, first, second, and third resistance means in series, the latter resistance means connected to said amplifier input, means for selectively applying a D. C. voltage ($E_i$) to said first resistance means, first capacitance means between ground and the point joining said first and second resistance means, and second capacitance means between ground and the point joining said second and third resistance means, said voltage $E_i$, the instantaneous voltage $e_o$ delivered to said amplifier means, and said resistance and capacitance means all being related in accordance with the relations:

(1) $$Am = \frac{KE_i}{R_1R_2R_3C_1C_2}$$

(2) $$Vm = \frac{Am}{\alpha(\beta/\alpha-1)} \left( e^{\frac{-\log_e \beta/\alpha}{\beta/\alpha-1}} - e^{\frac{\log_e \beta/\alpha}{\beta/\alpha-1}} \right)$$

wherein $Am$ and $Vm$ are the maximum acceleration and velocity, respectively, of the servo required in service; $R_1$, $R_2$, $R_3$, $C_1$, and $C_2$ represent the values of said resistance and capacitive means, respectively; K represents a constant, and (3) $$\beta+\alpha = \frac{G_1+G_2}{C_1} + \frac{G_2+G_3}{C_2}$$

(4) $$\alpha\beta = \frac{G_1G_2 + G_2G_3 + G_3G_1}{C_1C_2}$$

where $G_1$, $G_2$, and $G_3$ are the conductances of $R_1$, $R_2$ and $R_3$, respectively.

5. The network of claim 1 in which the ratio $$\frac{E_i}{R_1+R_2+R_3}$$

does not exceed a value $$\frac{\theta_m}{K}$$

where $\theta_m$ is the maximum permissible value of $\theta_o$.

6. The network of claim 3 in which the ratio $$\frac{E_i}{R_1+R_2+R_3}$$

does not exceed a value $$\frac{\theta_m}{K}$$

where $\theta_m$ is the total maximum permissible deviation in the servo from its null position.

References Cited in the file of this patent

UNITED STATES PATENTS 2,439,198    Bedford _____ Apr. 6, 1948